United States Patent [19]

Shields

[11] 4,046,543
[45] Sept. 6, 1977

[54] METHOD AND APPARATUS FOR TEMPERING MOVING GLASS SHEETS

[75] Inventor: George B. Shields, Lower Burrell, Pa.

[73] Assignee: PPG Industries, Inc., Pittsburgh, Pa.

[21] Appl. No.: 679,523

[22] Filed: Apr. 23, 1976

[51] Int. Cl.² .............................................. C03B 27/00
[52] U.S. Cl. ................................... 65/25 A; 65/104; 65/114; 65/182 A; 65/348
[58] Field of Search ................ 65/104, 114, 348, 349, 65/350, 351, 182 A, 25 A

[56] References Cited

U.S. PATENT DOCUMENTS 3,223,500  12/1965  Misson ........................ 65/182 A X
3,672,861  6/1972  Ritter, Jr. et al. .................... 65/350

FOREIGN PATENT DOCUMENTS 2,024,397  4/1969  France ................................. 65/114

Primary Examiner—Arthur D. Kellogg
Attorney, Agent, or Firm—Dennis G. Millman; Edward I. Mates

[57] ABSTRACT

This invention relates to the tempering of glass sheets, and particularly concerns cooling heat-softened glass sheets sufficiently rapidly to induce a stress pattern through the thickness of the glass of sufficient magnitude to temper the glass sheets with minimum surface deformation in a process where flat glass sheets are conveyed while supported on a gaseous bed.

34 Claims, 13 Drawing Figures

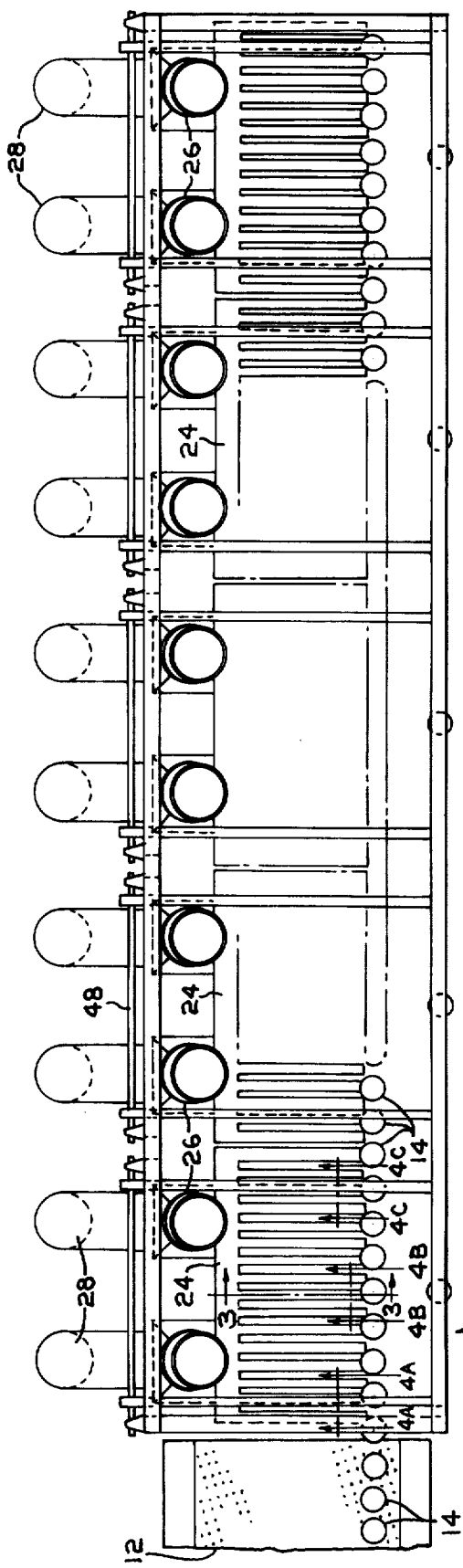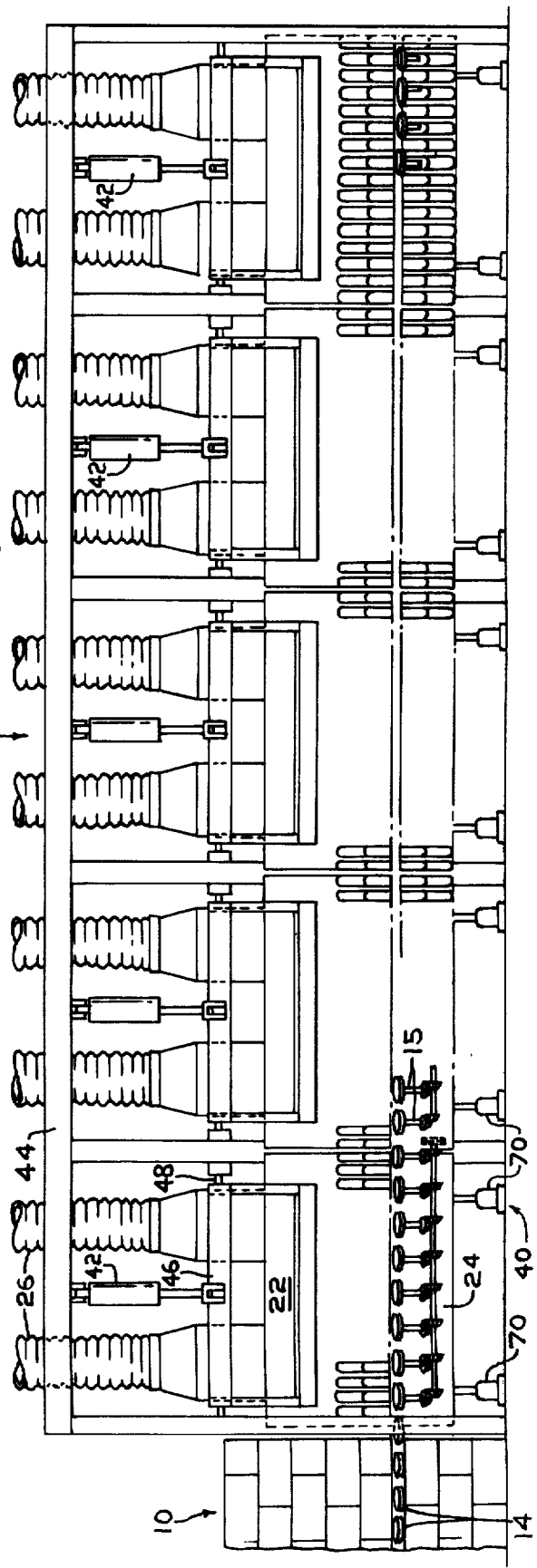
Fig. 1
Fig. 2

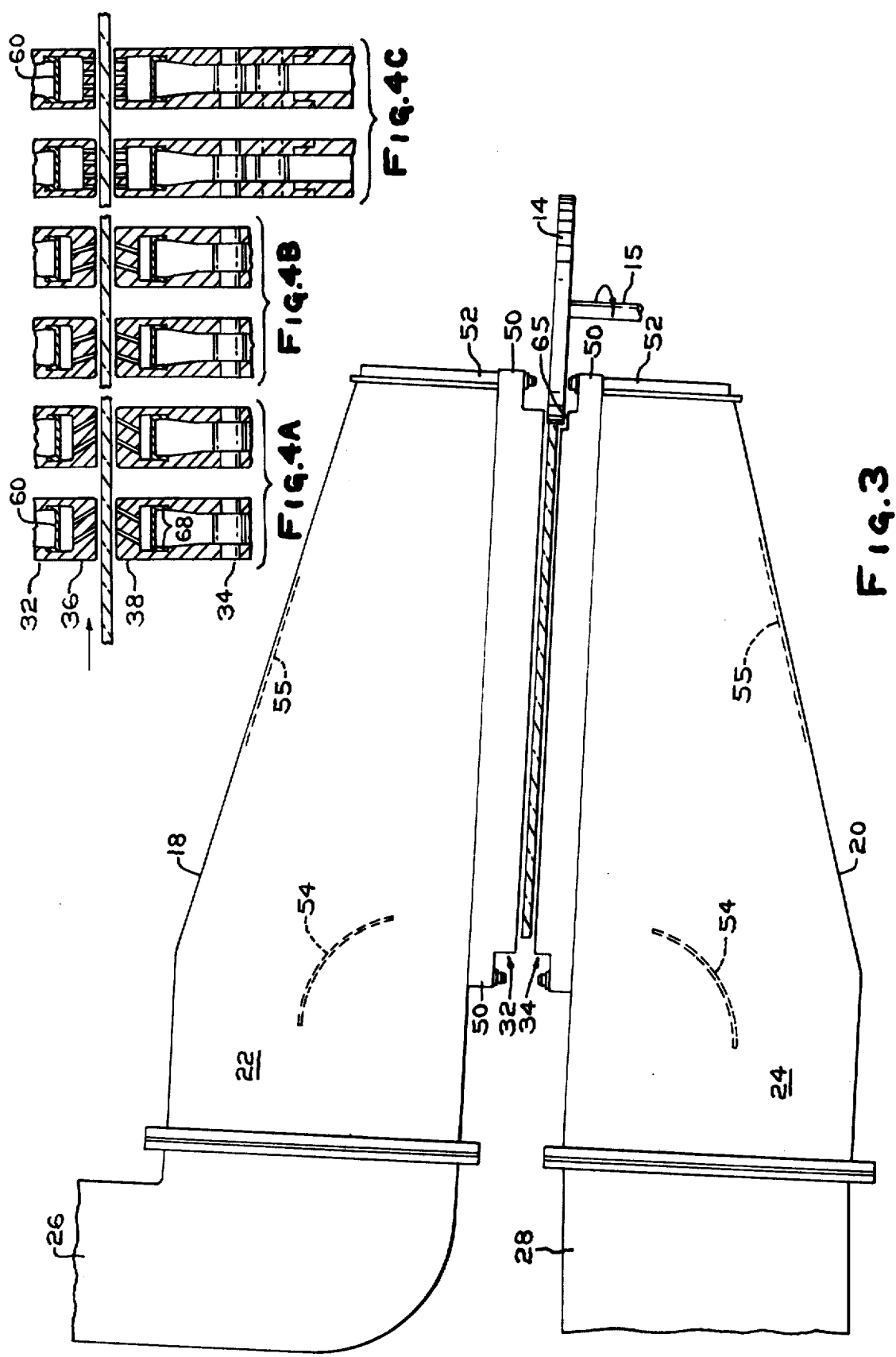

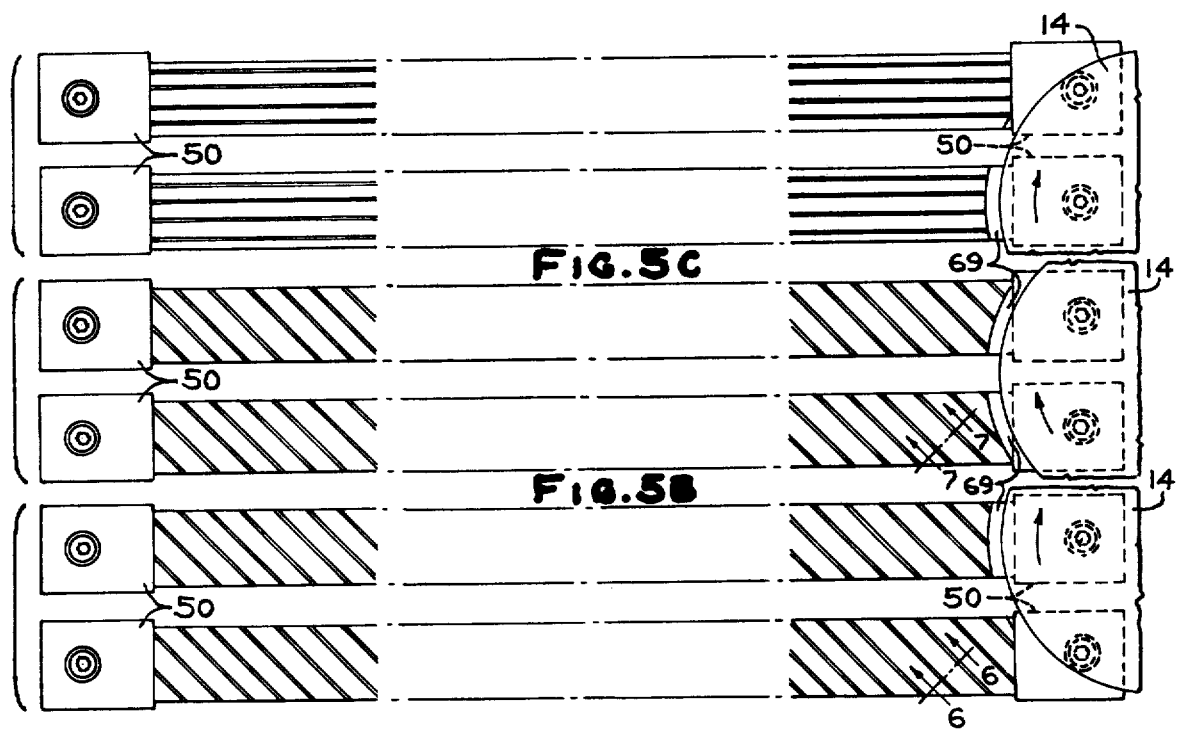
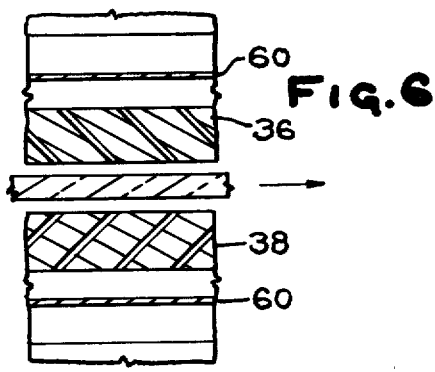
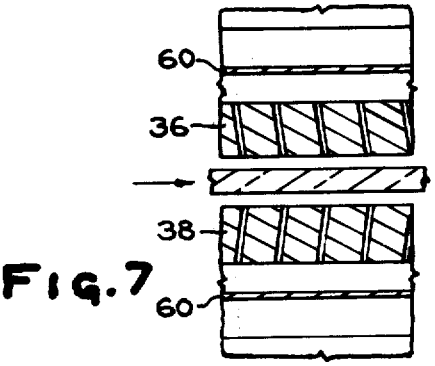
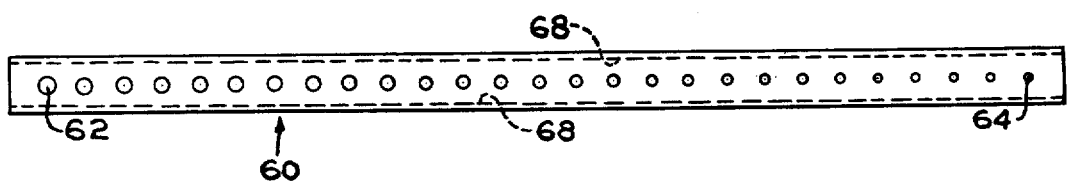
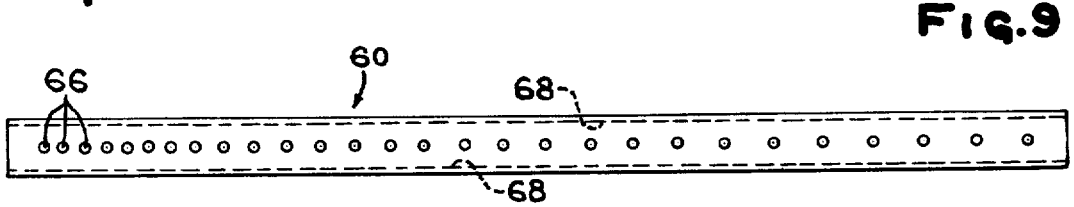

METHOD AND APPARATUS FOR TEMPERING MOVING GLASS SHEETS

BACKGROUND OF THE INVENTION

1. FIELD OF THE INVENTION

This invention relates to the tempering of glass sheets and, more specifically, to the cooling of hot glass sheets involved in their tempering while conveying the sheets through a cooling station immediately downstream of a furnace wherein the conveyed sheets are supported on a gaseous bed with their major surfaces out of contact with solid members. This cooling involves a system for supplying gas in heat exchange relationship and/or supporting relationship to a sheet or ribbon of glass. The support system is particularly adapted for handling glass in sheet or ribbon form without marring or otherwise producing uncontrollable deformation in the major surfaces of the sheet, even when the glass in at a deformation temperature.

In fabricating glass through known manufacturing techniques of bending, tempering, annealing or coating and combinations of such techniques to form end products having characteristics and uses different from the original product, it is necessary to heat the glass sheets to a temperature above that at which the major surfaces or the contour thereof is changed by deforming stress on contact with solid members. Where it is desired to strengthen the glass, it is further necessary to cool the glass sheets rapidly from such a deformation temperature to a lower temperature below the annealing range of the glass. The effectiveness of such strengthening is improved by an increase in the rate at which heat is removed from the surfaces with respect to the center of the thickness of the glass sheets.

Efficient glass sheet fabrication involving the techniques previously mentioned requires that the glass sheets undergoing treatment be conveyed while hot. The need to convey glass sheets at high temperature has involved undesirable deformation or marring of the major surfaces of glass sheets undergoing treatment due to physical contact of its major surfaces with supporting and conveying apparatus while the glass is at elevated temperatures. Glass sheets have been supported on gaseous beds to overcome the defects of deformation and marring due to physical contact of their major surfaces with solid members at elevated temperatures. Glass sheets have been conveyed through these gaseous beds by supporting the sheets at a small oblique angle to the horizontal and engaging the lower edges thereof with the peripheries of rotating driving discs.

Attempts to cool the glass surfaces rapidly has involved the development of modules for supplying cool gas in a pressure pattern that is non-uniform across the dimension of the glass sheets transverse to their direction of movement through a space between opposite arrays of modules disposed above and below the upper and lower major surfaces of the conveyed glass sheets. Non-uniform rates of cooling have developed non-uniform stress patterns, which are accompanied by optical non-uniformities, sometimes called Q-lines.

One technique for minimizing the appearance of Q-lines has been the application of blasts of air through narrow elongated slots, preferably narrower than one millimeter, extending continuously across the entire width of the conveyed glass sheets. Recognizing that it is difficult to maintain uniform width along the entire length of narrow slots, the prior art used thin mesh screens to separate the walls of the narrow slots and to maintain the uniformity of slot width. The presence of screens impaired the free flow of air through the slots and, hence, limited the heat transfer rate due to the impingement against the glass surface by gas streams flowing through the narrow slots en route to the glass surface. It became necessary to make the prior art modules hollow and to flow heat exchanging liquid through the hollow passages within the hollowed modules to improve the heat exchange rate by radiation. This solution introduced the problem of handling a liquid supply system.

When glass must be tempered, a large escape area must be provided for the impinging blasts of cooling medium, such as air, to be released readily from the central portion of the gaseous bed to avoid the establishment of a non-uniform pressure profile across the width of glass sheets transverse to the direction of glass movement. Such pressure profile increases toward the center of the glass and causes the glass to develop one of two metastable conditions, one in which the center of the glass sheets bows upward and another in which the center of the glass sheets bows downward.

When glass is supported on a gaseous support, the thickness of the gas bed is maintained as thin as possible to enable the incoming gas streams to impinge on the glass surface as efficiently as possible rather than blending with the gas bed that is already present. Therefore, when the glass develops a bowed shaped due to the metastable conditions described previously, there is sufficient room for the glass to be conveyed between the upper and lower arrays of modules that supply the gaseous cooling medium needed to cool the glass sufficiently rapidly to develop a stress pattern through the glass thickness that strengthens the glass sufficiently so that the glass develops at least a partial temper.

In prior art apparatus providing thin, elongated slots for the application of gas under pressure interspersed with elongated slots for gas removal, it was considered advantageous to have the portion of the area of the supporting surface occupied by elongated slots to not substantially exceed 10 percent. While elongated slots extending across the entire width tend to overcome the conditions that cause the metastable conditions in the glass, limiting the total slot area to not substantially more than 10 percent limits the rate at which the gas supplied for cooling can provide heat exchange with the moving glass sheets because the rate of gas flow through the slots and between the glass surfaces and the modules must necessarily be limited by the limited area provided for removal of cooling medium.

Tempering produced by heating a glass sheet above its annealing range and then rapidly chilling its surfaces to below the strain point while the interior is still hot and continuing the rapid chilling until the entire glass sheet cools to below its strain point causes the glass sheet to develop a skin of compression stress that surrounds the glass interior which is stressed in tension. Such a stress distribution makes the glass sheet much stronger than untempered glass so that tempered glass is less likely to shatter than untempered glass when struck by an object. Furthermore, in the less frequent times when an outside force is sufficiently large to cause tempered glass to fracture, tempered glass breaks up into a large number of relatively smoothly surfaced, relatively small particles which are far less dangerous than the relatively large pieces with relatively jagged edges that result from the fracture of untempered glass.

2. DESCRIPTION OF THE PRIOR ART

U.S. Pat. No. 3,607,198 to Meunier et al discloses a method and apparatus for moving hot glass sheets and similar ribbons that are supported pneumatically out of contact with solid surfaces by establishing alternate zones of static and kinetic gas pressure along the path of sheet movement. Each zone extends substantially across the full width of the sheet. Cool air under pressure is applied through a first multiplicity of slots, which are parallel and extend continuously substantially the full width of the ribbon and a second multiplicity of exhaust slots for the exhaustion of air supplied through the first multiplicity of slots. A pair of pressure applying slots is located between each consecutive two exhaust slots. The distance between the pressure applying slots of a pair is greater than the distance between each pressure applying slot and its adjacent exhaust slot. The total area occupied by the slots is not substantially more than 10 percent of the whole glass sheet facing surface of the supporting bed. The pressure applying slots are preferably between 0.4 and 0.7 millimeter and need not be greater than 1 millimeter wide, and the exhaust slots are between 1.5 and 2 millimeters wide.

The Meunier et al patent is designed for annealing glass sheets. Hence, even if there is some backward flow of the support gas into the furnace, it is not so extensive as to impair the annealing process or to cause glass breakage as would be the case were the glass being tempered.

While this patent states its system can be used for tempering as well as annealing glass, it requires hollow passages in the slotted module housings and liquid to flow though the hollow passages to supplement the air cooling with radiation cooling. The small proportion of apertures in the Meunier et al apparatus makes it impractical for tempering by use of gas blasts exclusively. The need for a water supply system to supplement the gas supply system makes the Meunier et al apparatus awkward to use. The gas exhausted in the Meunier et al apparatus is recirculated. Such recirculation impairs the efficiency of the gas applied to cool the glass sheets unless the gas is cooled during its recirculation.

Furthermore, in handling sheets having a width on the order of 30 centimeters or more, it is difficult to maintain continuous uninterrupted slots of uniform width across the entire width of the glass sheets without reinforcing the modules containing slotted walls facing the opposite major glass sheet surfaces. The reinforcements, if in the form of wire mesh as in the Meunier et al apparatus, disrupt the continuity and uniformity of the flow of gas through the slots. If the reinforcements are solid members interconnecting the walls of the modules beneath the slotted walls, they have to be so close to the slots in the slotted walls to insure uniform width that they interrupt the continuity and uniformity of gas flow. Any substantial non-uniformity of glas flow imparts non-uniform cooling in an amount sufficient to cause Q-lines in the glass, particularly from modules installed in close proximity to the exit of the furnace.

Without the reinforcements or wire spacers in the slots of the module construction, the elongated slots develop non-uniform width which causes a non-uniform application of cooling medium even where the uniformity of flow of cooling medium is not interrupted by reinforcements. Therefore, the glass sheet heat treating art required a method of treatment different from and representing an improvement over that provided by the Meunier et al patent.

Belgium Pat. No. 787,880 to PPG Industries, Inc. discloses a method and apparatus for tempering glass sheets which contains spaced rows of modules, the glass facing walls of which are provided with a series of parallel arcuate vanes that cause streams of gaseous cooling medium to move in curvilinear paths that result in gas streams having a relatively large component of motion in the direction of glass sheet movement away from a furnace, and in a downstream direction of the path of glass movement where the gas streams impinge on the glass. The main purpose of directing the streams of cooling fluid downstream is to avoid flow of the cooling gas in an upstream direction into the exit portion of the furnace. Any upstream flow of cooling gas into the exit portion of the furnace cools the exit portion of the furnace and prevents the glass from developing sufficient heat for tempering and may also cause the glass sheets to leave the furnace exit at a non-uniform temperature. As a result, glass sheets insufficiently heated tend to break when subjected to streams of cooling gas downstream of the furnace exit.

Means is provided to adjust the effective exhaust area of the spaces between adjacent rows of modules. Different effective exhaust areas are most beneficial for different glass sheet thicknesses.

The tempering apparatus of the Belgium patent is composed of square modules, each provided with arcuate vanes that gradually change the direction of streams of cooling gas toward the major surfaces of the glass sheets from directions normal to the respective surfaces to directions oblique to the respective surfaces. Arcuate curving of the paths of movement for the cooling medium may cause some turbulence in the flow of cooling medium. Laminar flow is more efficient in chilling a glass surface than turbulent flow. The modules are arranged in rows 1 inch (25.4 millimeters) wide separated by spaces ranging from one-fourth inch (6.35 millimeters) to three-fourths inch (19.05 millimeters) depending on the thickness of glass sheets processed.

This patent is silent as to the width of the slots formed between adjacent vanes. However, the drawings would appear to indicate that each slot has a substantial width. Gas streams applied at a given rate of volume through slots of such width have less velocity than gas streams applied through thinner slots. Therefore, cooling by passing cold fluid through the wide arcuate slots between adjacent arcuate vanes requires some improvement.

French Pat. No. 2,024,397 discloses glass sheet tempering apparatus comprising sheets of slotted nozzles providing oblique passageways for the passage of tempering medium either in a direction oblique to the plane defining the path of glass travel through a cooling station through slots extending along lines normal to the path of glass sheet travel followed by obliquely arranged slots or through module rows that direct tempering medium toward the opposite glass surfaces. Passageways are provided for removing tempering medium in a direction parallel to the plane of the sheet and transverse to the path of glass travel after the medium impinges on the opposite major surfaces of the glass sheets as the latter pass through the cooling station. The passageways for removing tempering medium have restricted openings which inhibit the free removal of tempering medium from the vicinity of the respective glass surfaces. The presence of these restricted paths and the need to turn the blasts of tempering medium into directions normal to the component of blast movement parallel to the path of glass travel make the apparatus of the French patent less efficient than desired to remove the tempering medium from the glass after the tempering medium has cooled the glass surface. The glass sheets are conveyed either by roller discs that engage an edge of each glass sheet or rollers that engage a supported major surface of the glass sheets and also provide boundaries for exhaust passages for removing tempering medium.

U.S. Pat. No. 3,395,943 to Wilde discloses the use of gaseous streams for maintaining a gaseous support under a glass surface and directs additional gaseous streams against the exposed periphery capable of developing forces transversely of the sheet. Some of these additional gaseous streams are directed against the rear edge to propel the glass sheet forwardly and other gaseous streams are directed transversely to maintain the lateral position of the sheet.

British Pat. No. 773,469 discloses apparatus for cooling and quenching glass sheets that are gripped by tongs during transport through a chilling station. Cold tempering medium is applied through oblique slots that direct air blasts obliquely away from a furnace exit in a downstream direction of glass sheet movement. The slots are oriented to apply a downward component of motion to the air blasts that impinge against the opposite glass sheet surfaces to reduce any tendency of the sheets to flutter and strike the opposite blast heads which supply air for application to the glass surfaces through the nozzles.

Despite all the patents enumerated, a need still existed to produce thin glass sheets having higher temper values combined with optical properties superior to those obtainable from the prior art. The present invention provides a novel combination of selected prior art features to attain such desired results.

SUMMARY OF THE INVENTION

The present invention provides a glass tempering system comprising novel combinations of at least several of the following features. The system includes an elongated bed comprising a plurality of longitudinally spaced modules immediately downstream of the furnace exit that are provided with thin slots angularly directed so as to provide thin, short, laminar streams of tempering medium having, in addition to a component of motion normal to the major glass sheet surface sufficient to provide a significant cooling force, one component of motion away from the furnace and another, simultaneous component of motion transverse to the path of glass sheet movement to force an edge of the glass sheets against a plurality of rotating driving discs which propel the glass sheets through the cooling station by frictional drive. At least 20 percent of the area of the gas supplying bed is open across the entire width of the bed to provide sufficient exhaust passages between modules for removing the gaseous tempering medium as efficiently as possible after it has impinged against the moving glass sheets. The individual slot type passages through which steams of tempering fluid are applied have an approximately uniform width of at least 0.010 inch (about 0.25 millimeter) and not exceeding 1/32 inch (0.8 millimeter) and the total area of the stream applying passages does not exceed about 6 percent of the area of the bed.

In a specific embodiment of the present invention, the modules are arranged so that those immediately downstream of the furnace exit have their apertured walls provided with thin slots extending through the wall thickness at a relatively large angle of obliquity with respect to the direction normal to the major glass sheet surfaces and modules located further downstream have their apertured walls provided with thin slots extending through the wall thickness at angles of less obliquity with respect to the planes normal to the glass sheet surfaces. Thus, tempering medium is directed in laminar flow with a relatively small proportion of its force provided in a component directed normal to the heat-softened glass surfaces near the furnace exit where the relatively hot glass is most susceptible to distortion accompanied by a relatively large proportion of its force provided in a component in a direction of glass sheet movement away from the furnace exit in a downstream direction. Nevertheless, the component of force applied normal to the major glass sheet surfaces is sufficient to produce a significant amount of cooling of the major surfaces of the glass sheets moving across the streams of gaseous tempering medium. Tempering medium applied through the modules with less oblique slots located further downstream of the furnace exit provide a lesser force component in the direction of glass sheet movement accompanied by a greater force component normal to the glass surfaces in the region of the cooling station where the glass surfaces are hardened sufficiently by cooling to withstand the impingement of stronger blasts thereagainst. The blasts having intermediate obliquity provide less resistance to the downstream flow of the oblique blasts applied near the furnace exit than blasts applied normal to the glass. This arrangement helps remove the blasts from the furnace exit while improving the rate of glass cooling.

In the downstream region of the cooling station where the glass sheet surfaces are still harder, the glass tempering modules may be provided with slits that extend lengthwise of the modules and that are directed normal to the glass surfaces. Impingement of tempering medium in a direction normal to the glass surface provides a greater heat exchange rate for a given rate of flow of gaseous tempering medium than at an oblique direction of impingement. However, a compromise is effected between a high rate of impingement normal to the glass surfaces that results in upstream flow of tempering medium into a furnace and an oblique direction of flow that avoids this problem at a slight sacrifice to the magnitude of the force component directed normal to the glass sheet surfaces.

Another feature of the present invention is the provision of thin slots that extend obliquely of apertured, glass facing walls along the length of the modules so as to avoid the need for reinforcements interconnecting the walls of the modules that support the apertured walls, or for screens within the slots that help maintain a uniform width of slot. Such reinforcements break up the flow pattern of tempering medium en route to the major glass sheet surfaces and disrupt the uniformity of cooling pattern that would result if the flow pattern were not interrupted locally. In addition, the oblique slots have limited length so that the module walls provide sufficient rigidity to maintain uniform slot width without requiring internal reinforcements or screens that interrupt free flow of tempering medium.

The use of thin slots permits a series of high velocity air jets which promote a high heat transfer coefficient at the major glass sheet surfaces using a given rate of flow of tempering medium. The oblique slots are arranged relative to the apertured walls of the modules in such a manner that adjacent slots of each module overlap one another along the length of the elongated bed. Thus, each glass sheet increment transverse to the path of glass sheet movement intercepts a plurality of oblique blasts imparted through oblique slots as it traverses the portion of said path in alignment with each of said modules. This arrangement provides substantially uniform cooling from transverse increment to transverse increment without requiring devices that impair the free flow of tempering medium as the cost for insuring uniformity of slit width over a long slot. The overlapping of slots along the path of glass movement causes the cooling of the glass surface to be sufficiently uniform as to minimize the development of Q-lines.

In a specific embodiment of the present invention, each module is provided with means for ease in attachment or removal to its associated plenum chamber. Different module arrangements may be required for processing glass sheets of different thicknesses and/or widths. Facility in changing module configurations with minimum loss of time from production is an important feature of this invention.

In a specific embodiment of this invention, the plenum chambers are arranged in groups, each group communicating with a common plenum chamber. Means is provided to supply gaseous tempering medium under pressure to each common plenum chamber with means for controlling the pressure disposed in the supply system for each common plenum chamber so that the pressure of the gaseous tempering medium applied to each common plenum chamber may be controlled independently of the pressure for each other common plenum chamber. Several individual plenum chambers in the form of elongated chambers extend across the cooling station of glass sheet tempering apparatus from each of the common plenum chambers. All of the latter are disposed to one side of the apparatus to permit operating personnel access to the other side of the apparatus when needed.

The downstream common plenum chambers located in the region of the cooling station beyond the location where the glass sheet surfaces are set may be provided with elongated plenum chambers having nozzle-type openings rather than modules facing the glass sheets passing therebetween. The nozzle-type openings may include elongated slot-type openings having much wider openings than the slots in the modules or round openings having diameters much larger than the width of the module slots or combinations of wider openings of either type.

Since tempering medium is supplied under pressure from one side of the elongated plenum chambers in a direction transverse to the length of the cooling station, several features are included to provide a desired pressure pattern for the gaseous tempering medium applied through the individual modules against the opposite glass sheet surfaces. These include providing each elongated plenum chamber with an oblique wall opposite to the apertured wall of its attached module such that the cross-section of the elongated plenum chambers diminishes in the direction away from their associated common plenum chamber and/or providing each elongated plenum chamber with one or more curved deflectors that change the ratio of gaseous tempering medium supplied to different portions of the length of the elongated plenum chambers and/or providing a porous member in the path of movement of the gaseous tempering medium toward the apertured wall of at least certain modules, the porous member being constructed and arranged to provide a desired pattern of flow of tempering medium along the length of the apertured wall of the associated module.

The present invention will be better understood in the light of a description of an illustrative embodiment thereof. Although the illustrative embodiment refers to tempering apparatus that uses a gaseous tempering medium such as air to cool hot glass sheets sufficiently rapidly to impart a temper, it is understood that the term "gaseous" for the purpose of the present invention includes vapors, mixtures of gases, mixtures of gases and vapors, sublimable materials and mixtures of gases with sublimable materials. In fact, the tempering media suitable for use with the present invention may incorporate materials whose heat of evaporation or heat of sublimation may provide at least part of the cooling effect required for the tempering medium. Only materials that react chemically with the glass surfaces to weaken the latter when directed thereagainst are excluded from materials suitable for use as tempering media.

In describing the present invention, the term "tempering" is intended to mean establishing a stress pattern in a glass sheet having a surface compression stress of at least 10,000 pounds per square inch (about 340 kilograms per square meter) as measured by a DSR refractometer described in "The Nondestructive Measurement of Surface Stresses in Glass" by R. W. Ansevin, ISA Transactions, Volume 4, Number 4, October 1965.

BRIEF DESCRIPTION OF THE DRAWINGS

In the drawings that form part of a description of an illustrative embodiment of the present invention and wherein like reference numbers refer to like structural elements, FIG. 1 is a fragmentary longitudinal side elevation of a portion of glass sheet tempering apparatus incorporating an illustrative embodiment of the present invention with special emphasis on its cooling station;

FIG. 2 is a fragmentary, longitudinal sectional view of the portion of the apparatus depicted in FIG. 1;

FIG. 3 is an enlarged fragmentary sectional view taken along the line 3—3 of FIG. 2 showing how a pair of opposing upper and lower elongated plenums and their associated modules are arranged in said apparatus;

FIG. 4 is a composite of FIGS. 4A, 4B and 4C, which are fragmentary transverse sectional views of different pairs of adjacent modules located at different locations along the cooling station and taken along the lines 4A—4A, 4B—4B and 4C—4C of FIG. 2;

FIG. 5 is a composite of FIGS. 5A, 5B and 5C, which are fragmentary plan views taken of apertured walls of the modules depicted in FIG. 4;

FIG. 6 is an enlarged section taken along the lines 6—6 of a portion of a module depicted in FIG. 5A;

FIG. 7 is an enlarged sectionalized view taken along the lines 7—7 of a portion of a module depicted in FIG. 5B; and FIGS. 8 and 9 are plan views of two types of porous members capable of use in conjunction with the modules and elongated plenum chambers according to the present invention.

DESCRIPTION OF THE ILLUSTRATIVE EMBODIMENT

Referring to the drawings, an illustrative embodiment of apparatus incorporating the present invention comprises a gas hearth type furnace 10 of the type depicted in U.S. Pat. No. 3,300,290 to George W. Misson. In such a gas hearth furnace, glass sheets are introduced into a support area at a temperature below that at which the major surfaces will mar on physical contact with solid objects. The glass sheets are heated in turn above the deformation temperature while being supported primarily by gas supplied through apertures in a gas support bed 12 and the glass sheets are cooled after they leave the furnace to a temperature below deformation temperature before they are removed from a gas support. When glass sheets are so treated, the heating is usually supplied by hot gas through the gas support bed supplemented by radiant heat supplied by heaters within the furnace 10. The latter are usually electrical radiant heaters, although gas heaters may also be employed. After the glass sheets are heated to a temperature sufficient for tempering, they are usually cooled sufficiently rapidly to temper and, hence strengthen the sheets.

According to a typical gas hearth operation, the gas support bed 12 is supported on vertically adjustable jacks (not shown) which support the bed 12 so that its upper surface extends transversely to its length at a slight oblique angle (less than 15°) to the horizontal, usually approximately 5°, and the glass sheets while supported on a gaseous support of the gas support bed 12 in such a tilted relationship to the horizontal have their lower edges driven by friction in contact with a plurality of rotating driving discs 14 of uniform diameter, each mounted on a different drive shaft 15. The latter are aligned along a line parallel to the longitudinal dimension of the gaseous bed 12 so that the driving discs 14 have a common tangential line extending parallel to the direction of movement of the glass sheets.

Beyond the gas hearth type furnace 10 is a cooling station 16, at one side of which are located additional rotating driving discs 14 aligned with the driving discs that propel the glass sheets through the gas hearth type furnace 10. In the cooling station, there are a plurality of longitudinally spaced, upper, elongated plenum chambers 18 directly opposing a corresponding series of lower, elongated plenum chambers 20, the latter being arranged in alignment with the bed 12 to form a continuation thereof at an orientation depicted in FIG. 3. The plenum chambers 18 and 20 are in the form of narrow elongated fingers having non-uniform height and extend parallel to one another transversely of the length of the cooling station 16. The higher ends are disposed to the side of the cooling station opposite the side occupied by the rotating driving discs 14, and merge into respective upper and lower common plenum chambers 22 and 24, respectively. Each of the upper common plenum chambers 22 communicates through one of a series of flexible upper supply conduits 26 to blower means (not shown). The lower common plenum chambers 24 are connected through flexible lower supply conduits 28 to blower means (not shown). Suitable pressure controls are provided by way of adjustable valves (not shown) in the supply conduits 26 and 28.

The illustrated apparatus comprises five upper common plenum chambers 22 and five opposite lower common plenum chambers 24. Each common plenum chamber is supplied with pressurized air through two flexible supply conduits. There are approximately 50 upper and 50 lower elongated plenum chambers for each common plenum chamber, except that the first upper and lower common plenum chambers are subdivided into two zones, each individually controlled and each communicating with about 25 elongated plenum chambers. However, the exact number can be varied according to the design of the system.

Each of the elongated upper plenum chambers 18 and elongated lower plenum chambers 20 is attached to a module 32 and 34, respectively, (FIG. 3). Each module is closed at its ends and has an open side facing its attached module. Each upper module 32 has a lower apertured wall 36 and each lower module 34 has an upper apertured wall 38 so that gas supplied under pressure is directed through narrow slots through the thickness of the apertured walls 36 and 38. The slots of the upstream modules are angled to provide a component of force for cold gas in a downstream direction of movement for glass sheets away from the exit of the furnace 10 when cold air is supplied under pressure to the elongated plenums 18 and 20. In addition, the slots extend obliquely across the apertured walls 36 and 38 at an angle such that a component of force is provided to urge the glass sheets in a downward direction transverse to the path of movement to force their lower edges into a slightly greater frictional engagement against the inner common tangential line of the driving discs 14 than would be provided by the mass of each glass sheet alone. To provide this feature, the slots for the apertured walls of each of the modules, in the first part of the cooling station 16, are angled through the slotted wall of their respective modules facing the opposite surfaces of glass sheets moving between the upper plenum chambers 18 and the lower plenum chambers 20 so that the upwardly facing apertured walls 38 of lower modules 34 are provided with narrow, elongated slots that are disposed obliquely across their upper surfaces as depicted in FIG. 5A. The angle of obliquity can be 20° to 70° with respect to the axis of movement of the glass sheet. However, the view in FIG. 5A shows the slots angled at 45° to the path of movement.

The downwardly facing apertured walls 36 of upper modules 32 have their lower surfaces provided with slots that are also angled to provide a mirror image of the angling of the slots through the apertured walls 38 of the lower modules 34. This obliquity of the surface slots in walls 36 and 38 provides the component of motion transverse to the path of glass sheet movement that insures sufficient frictional force between the glass sheets against the rotating driving discs 14 as to insure uniform movement of the glass sheets through the cooling station 16.

FIGS. 4A, 4B, 4C, 6 and 7 show how the slots are directed obliquely through the thickness of the apertured walls of the modules in a direction toward the glass sheet movement path at different positions along the first zones. Near the furnace exit the slots extend at a maximum forward angle of obliquity to minimize the chance of cold tempering medium flowing upstream into the furnace 10. At an intermediate position, the slots extend at a smaller angle of obliquity and in the downstream positions of the first zone and throughout the second zones extend through the wall thickness normal to the glass major surfaces. Such combination of obliquities permits a combination of low chance of upstream flow of tempering medium that would cool the furnace with most efficient glass surface cooling consistent with minimum surface distrotion.

The upper surface of the apertured walls 38 of the lower modules 34 are aligned with the upper surface of the gaseous bed 12 in the furnace 10. Thus, glass sheets are supported for movement through the furnace 10 and the cooling station 16 in approximatley the same oblique plane with their lower major surface supported on a gaseous bed of hot gas within the hot furnace and on a supporting bed of cool gaseous tempering medium, usually pressurized air, within the cooling station 16.

The lower plenum chambers 20 and the lower common plenum chambers 24 are vertically adjustable relative to a support structure 40. Each of the upper common plenum chambers 22 and their elongated upper plenum chambers 18 are pivoted to the support structure 40 through a piston arrangement 42. The latter is pivotally attached to a rigid superstructure 44 of the support structure 40 at its upper end and at its lower end to a cantilever housing 46 to which an associated upper common plenum chamber 22 is attached. Each cantilever housing 46 is pivoted on pivot rods 48 carried by the support structure 40. The piston arrangements 42 are useful to pivot the cantilever housings 46 about their respective pivot rods 48, which extend longitudinally of the cooling station 16, to separate the upper plenum chambers 18 from the lower plenum chambers 20 whenever it is necessary to inspect or provide some sort of maintenance or repair to the cooling station 16. The pivot rods 48 are located on the longitudinally extending side of the cooling station 16 that is also occupied by the tempering medium delivery system comprising the flexible upper supply conduits 26 and the flexible lower supply conduits 28. This leaves sufficient space for operating personnel to gain access to the space between the upper plenum chambers 18 and the lower plenum chambers 20 when the piston arrangement is actuated to separate the respective associated upper common plenum chamber from its opposite lower common plenum chamber.

Depending on the thickness of glass sheets being processed, their speed of conveyance through the furnace and other factors that relate to the temper desired for the glass, modules of different construction and different arrangements of the combination of modules may be required. For example, the length, width, distance of separation and the orientation of the slots in the apertured walls of the modules may require changing as the pattern of production parts undergoing production is changed. Therefore, it is desirable to make it possible to change a module attached to each elongated plenum chamber with facility when required.

Each end of each module is provided with an apertured end lug 50 adapted to mate with a corresponding lug 52 carried by the corresponding elongated plenum chamber. The lugs are readily bolted together. When attached properly, each module fits exactly in communication with its corresponding elongated plenum chamber so that gaseous tempering medium applied under pressure to the plenum chamber is directed through the corresponding module to be discharged through the narrow slots on the apertured wall of the module.

The apertured walls of the modules are separated from one another to provide a clearance 150 mils (3.81 millimeters) high between the opposing surfaces of the apertured walls of the opposing sets of modules when the apparatus is handling glass sheets 90 mils (2.286 millimeters) thick. In a specific embodiment of this invention, the modules are 1 inch (25. 4 millimeters) wide with a spacing of ½ inch (12.7 millimeters) between adjacent modules. The initial modules have their slots oriented at a 45° angle to the axis of glass sheet movement through the cooling station 16 that is parallel to the line of alignment of the driving shafts 15 of the rotating driving discs 14.

The first three pairs of modules are oriented through the thickness of their respective apertured walls at a forward angle of 45° as is shown in FIG. 4A and in FIG. 6. The next five pairs of opposing modules have their slots oriented so that they extend at a 45° angle with the axis of glass travel through the cooling station 16 as depicted in FIG. 5B. However, the slope of the slots through the thickness of the apertured walls of the opposing modules is at a small angle with respect to the normal to the opposite glass sheet surfaces. In a typical embodiment depicted in FIGS. 4B and 7, this angle is 7.5°.

Further downstream of the first zones and through the second zones where the glass sheets have their surfaces sufficiently hardened by cooling, the slots in the apertured walls of the opposing modules are shown to extend normal to the axis of glass sheet movement and to extend through the thickness of the walls in a direction normal to the major opposing surfaces of the glass sheets. In this location of the cooling station 16, the modules may be provided with internal reinforcements interconnecting the walls extending away from the apertured module walls to insure uniform slot width. The interruptions in uniformity of gas flow around the internal reinforcements do not have a significant deteriorating effect on the optical characteristics of the glass because the glass surfaces are sufficiently hard by the time the glass reaches those modules depicted in FIG. 5C.

With the arrangement thus described, glass sheets that leave the exit of furnace 10 are cooled by blasts of relatively cool gaseous tempering medium directed with a relatively large component in the direction of glass movement immediately downstream of the furnace exit and the angle of orientation in the direction of glass sheet movement is diminished and eventually eliminated completely for gaseous tempering medium expelled through the modules disposed in the downstream portion of the first zone.

The additional common plenum chambers downstream of the second zones provide air under individually controlled pressure to an array of nozzles of conventional construction, such as pipe stems or slot-type nozzles having relatively large openings. These additional common plenum chambers are provided for cooling the glass to handling temperature as the temper is established as the glass passes through the first and second zones of the first pair of opposing common plenum chambers.

Since the tempering medium is supplied from one side of the cooling station into the elongated plenum chambers 18 and 20, additional features are incorporated in the elongated plenum chamber structure to equalize the flow of tempering medium into the slots in the apertured module walls 36 and 38, respectively. These structural features include one or more arcuate deflectors 54 fixed in position in each of the elongated upper plenum chambers 18 and each of the elongated lower plenum chambers 20. The arcuate deflectors 54 are concavely curved in their surface facing the respective modules. In addition, the cross-sectional area of the opposing elongated upper plenum chambers 18 and elongated lower plenum chambers 20 decreases from their relatively high ends that communicate with upper and lower common plenum chambers 22 and 24, respectively, and their opposite ends adjacent the rotating driving discs 14 by providing oblique remote walls 55 for the respective elongated plenum chambers 18 and 20. The oblique remote walls 55 are constructed and arranged to be a maximum distance from the respective module for the elongated plenum chamber at the ends adjacent the associated common plenum chamber and to have the distance diminish gradually toward the other end of the elongated plenum chamber near the driving discs 14.

Another feature used to control the flow pattern of tempering medium across the width of the cooling station 16 involves the use of porous members 60. The porous members 60 may be in the form of screens or apertured plates or channel shaped members of a porous construction having relatively large apertures 62 at one end near the common plenum chamber and relatively small apertures 64 at their other ends (as in FIG. 8) or apertures 66 of uniform size disposed with a greater aperture concentration at the end of the porous member closer to the common plenum chamber and a lesser concentration of open area at the other end of the porous member (as in FIG. 9) or any other desired configuration.

The porous members 60 are preferably of channel shape and are made of spring-like material having separate flanges 68 that fit snugly within screen receiving grooves contained in the modules 32 and 34, as is clearly shown in FIGS. 4A, 4B and 4C. Thus, air or other tempering medium that is applied to the upper and lower elongated plenum chambers 18 and 20 is deflected by virtue of the arcuate deflectors 54 and the oblique remote walls 55 together with the non-uniform filtering of the incoming gaseous tempering medium by virtue of the non-uniformity of the porosity along the length of the porous members 60 to provide a flow of tempering medium of any desired flow pattern against each of the surfaces of the glass sheets passing through the cooling station.

The porous members may be used to serve an additional purpose of independently controlling the rate of flow of gaseous tempering medium into each individual module supplied from a common plenum chamber. This enables operating personnel to adjust the rate of flow of gaseous tempering medium along the length of the gaseous bed in the cooling station 16.

Where required, the lower modules 34 have recessed outer portion 69. These recessed outer portions 69 are constructed and arranged in such a manner as to provide clearance spaces for the rotating driving discs 14 to enable the latter to have access to the edge of the glass sheets as the latter pass between opposed modules.

In a specific embodiment of the invention, the slots are of uniform width about 20 mils (approximately 0.51 millimeter) wide, although slot widths ranging from about 10 mils (approximately 0.25 millimeter) to 1/32 inch (approximately 0.8 millimeter) wide are acceptable.

The modules have a wall thickness of one-eighth inch (approximately 3.2 millimeters) for the side walls and approximately 3/16 inch (approximately 4.8 millimeters) for the apertured walls. In the apertured wall surfaces facing the glass sheets, the slots are parallel to one another and are spaced from one another approximately one-fourth inch (approximately 6.35 millimeters) along the length of the modules (transverse to the axis of glass movement). The modules near the furnace exit extend obliquely of said axis. Further downstream in the cooling station, the apertured walls of the modules comprise four slots, each about 15 mils (approximately 0.38 millimeter) wide extending continuously along the length of the apertured module wall normal to said axis.

The dimensions and arrangements described are subject to some modification within limits, depending on various parameters enumerated previously. It is also understood that the number and arrangements of slots of the modules further downstream in the cooling station may vary from the exact number and arrangement shown. However, it is preferred to have three to five slots per downstream module. A typical slot arrangement comprises five slots equally distant to one another across the width of an apertured wall of a module having successive widths of 21 mils (approximately 0.53 millimeter), 21 mils (approximately 0.53 millimeter), 15 mils (approximately 0.38 millimeter), 21 mils (approximately 0.53 millimeter) and 21 mils (approximately 0.53 millimeter), respectively. Also, the width and separation of the obliquely extending slots in the upstream portion of the cooling station 16 may vary to some extent, depending on the thickness of glass sheet being treated. Generally, a higher cooling rate is needed for thinner glass sheets than for thicker glass sheets so that a larger number of thinner, more closely spaced slots is generally required for tempering thinner glass sheets than for thicker glass sheets.

Jacks 70 are provided to engage the lower common plenum chambers 24 to adjust the position and orientation of the latter for alignment of the lower elongated bed of the cooling station 16 with the bed 12 in the furnace 10. The upper common plenum chambers 22 are provided with adjustment means to raise and lower said upper common plenum chambers 22 to control the vertical distance that the upper module walls 36 are spaced above and parallel to the lower module walls 38. This distance varies with the thickness of the glass sheet being processed.

Typical operating parameters for the illustrative embodiment of apparatus conforming to the present invention and results obtained therefrom will now be provided. The apparatus was provided with three opposing pairs of rows of modules set at obliquities of 45° through the module wall thickness followed by five opposing pairs of rows of modules set at obliquities of 7.5° and followed by 17 opposing pairs of modules having four slots each 20 mils wide in the first zones and 25 opposing pairs of modules in the second zones of the first pair of common plenum chambers followed by conventional supply pipes extending from the elongated plenum chambers communicating with the additional four opposing pairs of common plenum chambers.

Shadowgraph tests have been developed at PPG Industries, Inc., the assignee of this invention, as a means of determining the optical qualities of glass sheets. In this test, a Balopticon projector located 25 feet (7.62 meters) from a screen is set up in a dark room to illuminate the screen. A glass sheet to be tested is supported between the projector and the screen and is oriented and its position adjusted until the illumination pattern has the worst non-uniform pattern obtainable. Its position relative to the screen is adjusted while maintaining the aforesaid orientation until a position is determined where the pattern begins to appear or disappear depending on the direction of glass sheet movement relative to the screen. Generally, the optical properties are considered better when said position is at a greater distance from the screen. While no standards have been established yet in the United States, at Canadian Pittsburgh Industries, a Canadian subsidiary of PPG Industries, Inc., a glass to screen distance of 3 inches (76.2 millimeters) is considered acceptable for glass sheets having a nominal thickness of one eighth inch (3.2 millimeters) and a glass to screen distance of 8 inches (203.2 millimeters) is considered acceptable for glass sheets having a nominal thickness of 3/16 inch (4.8 millimeters) based on shadowgraph test results.

The results of the shadowgraph tests are reported in units that correspond to the distance in inches from the screen to the sheet where the pattern begins to disappear. Thus, a value of 3 is the acceptable standard for glass one eighth inch (3.2 millimeters) thick and 8 is the acceptable standard for glass 3/16 inch (4.8 millimeters) thick on the shadowgraph test. Higher values than those listed as acceptable indicate acceptable test units while values below those listed indicate that the test units providing such results are usually unacceptable.

During a recent run on production apparatus constructed in accordance with the illustrative embodiment previously described and using standard operating conditions in the furnace and in the cooling station whose first pair of opposing common plenum chambers were modified by use of the module arrangement described previously, the following results were obtained for random sheets of clear float glass 34 inches by 76 inches (nominally 0.9 by 2 meters) of the thicknesses indicated.

| NOMINAL GLASS THICKNESS | SURFACE COMPRESSION STRESS (PSI)* | SHADOWGRAPH TEST SCORE | ACCEPTABLE SHADOWGRAPH STANDARD |
|---|---|---|---|
| 1/8 in. (3.2 mm) | 19,650 | 11 | 3 |
| 1/8 in. (3.2 mm) | 19,484 | 13 | 3 |
| 1/8 in. (3.2 mm) | 18,773 | 11 | 3 |
| 1/8 in. (3.2 mm) | 18,887 | 12 | 3 |
| 1/8 in. (3.2 mm) | 18,559 | 11 | 3 |
| 1/8 in. (3.2 mm) | 17,900 | 13 | 3 |
| 3/16 in. (4.8 mm) | 22,300 | 6 | 8 |
| 3/16 in. (4.8 mm) | 22,073 | 10 | 8 |
| 3/16 in. (4.8 mm) | 21,760 | 9 | 8 |
| 3/16 in. (4.8 mm) | 22,272 | 9 | 8 |
| 3/16 in. (4.8 mm) | 21,362 | 11 | 8 |
| 3/16 in. (4.8 mm) | 22,130 | 10 | 8 |
| 3/16 in. (4.8 mm) | 20,964 | 11 | 8 |
| 3/16 in. (4.8 mm) | 20,480 | 11 | 8 |

*Surface compression stresses reported are the average of readings obtained using the Differential Stress Refractometer at 9 different regions uniformly distributed on each sheet.

By way of comparison, the same production line having the elongated plenum chambers installed in the cooling station provided with so-called rosette modules of the type depicted in U.S. Pat. No. 3,223,500 to Misson, developed shadowgraph test readings averaging 5.67 units during production of glass sheets of nominal thickness of 3/16 inch (4.8 millimeters) in glass sheets of the same pattern size and in a corresponding temper range.

The results obtained indicated a combination of high stress values with acceptable optical properties for the modified tempering apparatus, thereby demonstrating the utility of the apparatus as modified by the inclusion of modules arranged as taught by the present invention.

The form of the invention shown and described in this disclosure represents an illustrative preferred embodiment and certain modifications thereof. It is understood that various changes may be made without departing from the gist of the invention as defined in the claimed subject matter that follows.

I claim:

1. An apparatus adjacent a furnace for tempering hot glass sheets by flowing cool streams of gaseous tempering medium against the opposite surfaces thereof comprising an upper elongated quench bed and a lower elongated quench bed in spaced, generally parallel relation to and facing said upper quench bed, each said quench bed including a series of modules adjacent said furnace, each provided with a flat glass sheet facing surface having a plurality of slots therethrough, each slot having an approximately uniform width of between about 1,100 inch (0.25 millimeter) and about 1/32 inch (0.8 millimeter) for applying thin streams of gaseous tempering medium against the surface of a succession of glass sheets conveyed longitudinally of said bed past said modules, said modules being spaced apart to provide therebetween longitudinally spaced exhaust passages extending transversly of said bed continuously across the entire width of said conveyed glass sheets, said elongated quench beds extending from an upstream end adjacent an exit of a furnace for heating said glass sheets to a temperature suitable for tempering and a downstream end spaced from said exit, the total area of said exhaust passages occupying at least about 20 percent of the area of said quench bed and the total area of said stream applying slots not exceeding about 6 percent of said quench bed area, and means to provide cool gaseous tempering medium at a rate sufficient to cause said gaseous tempering medium to flow through said slots at a rate sufficient to cool said glass sheets rapidly enough to temper said sheets and to be exhausted through said exhaust passages, wherein said elongated slots extend parallel to one another diagonally of the glass sheet facing surfaces of said modules disposed adjacent said furnace exit, and wherein adjacent elongated slots of each said module overlap one another along the length of said elongated bed, and said slots are directed diagonally through the thickness of said modules.

2. Apparatus as in claim 1, further including a plurality of glass edge engaging means located along one edge of said elongated quench beds for moving said glass sheets downstream between said beds, and said elongated slots are oriented to enable said blasts of gaseous tempering medium to provide a component of force against said glass sheets in a direction transverse of the length of said beds and toward said glass edge engaging means.

3. Apparatus as in claim 3, wherein each said flat apertured wall has a glass sheet facing surface in an oblique plane making a small angle of less than 15° with the horizontal and said glass edge engaging means is disposed along the lower longitudinal edge of said lower quench bed.

4. Apparatus as in claim 3, wherein said glass edge engaging means comprises a plurality of rotatable discs of a given diameter, each mounted concentrically on a different one of a plurality of aligned drive shafts for making rotating edge contact with the lower edge of said glass sheets to convey the latter along a path parallel to a line along which said drive shafts are aligned.

5. Apparatus as in claim 1, wherein said modules comprise a first pair of opposed modules located immediately downstream of said furnace exit and having their associated elongated slots directed diagonally through the thickness of said flat, apertured walls of said first pair of modules in a downstream direction disposed at a relatively large oblique angle to a plane normal to the major surface of glass sheets conveyed along the length of said bed and a second pair of opposed modules located downstream of said first pair of opposed modules and having elongated slots directed diagonally through the thickness of said flat, apertured walls of said second pair of opposed modules in a downstream direction disposed at a lesser oblique angle to said plane than said relatively large angle.

6. Apparatus as in claim 5, further including a third pair of opposed modules located downstream of said second pair of opposed modules and having elongated slots that extend parallel to one another normal to the thickness of said flat, apertured walls of said third pair of opposed modules.

7. An apparatus for applying streams of cool gaseous tempering medium against opposite surfaces of heated sheets of glass so as to temper the glass, comprising: upper and lower elongated quench beds spaced apart and facing one another in a generally parallel relationship, each quench bed extending in a longitudinal direction from an upstream location adjacent an exit of a furnace for heating the glass sheets to a temperature suitable for tempering to a downstream location spaced from said furnace, each quench bed including a plurality of modules each extending transversely across the width of the quench bed and having slots therethrough and communicating with means to provide pressurized gaseous tempering medium to the interior of said modules and said slots, said slots being about 0.25 to 0.8 millimeter in width and occupying no more than about 6 percent of the area of said quench beds and provided in sufficient numbers distributed throughout the area of each quench bed and so oriented as to direct thin, high velocity sheets of gaseous quenching medium over the surfaces of the glass sheets being conveyed longitudinally between said quench beds in sufficient quantities to cool said glass sheets rapidly enough to temper said sheets, said modules being spaced apart to form exhaust passages therebetween which extend across the width of the quench bed, said exhaust passages occupying at least about 20 percent of the area of said quench beds so as to exhaust the gaseous quenching medium from the vicinity of the glass sheets with minimal flow resistance.

8. Apparatus as in claim 7, wherein said means to provide cool gaseous tempering medium comprises a plurality of opposed pairs of common plenum chambers, each of said common plenum chambers communicating with a plurality of spaced apart elongated plenum chambers, each extending transversely of said elongated quench bed and communicating with one of said modules, and means to regulate the rate of flow of said cool gaseous tempering medium to each of said common plenum chambers independently of each other of said common plenum chambers.

9. Apparatus as in claim 7, wherein said means to provide cool gaseous tempering medium comprises a plurality of opposed pairs of common plenum chambers located along one side of said elongated quench bed, each said common plenum chamber communicating with a plurality of spaced elongated plenum chambers, each extending transversely of said elongated quench bed and communicating with one of said modules, said modules extending longitudinally of said elongated plenum chambers, and means associated with each said elongated plenum chamber to alter the pattern of flow of gaseous tempering medium from said common plenum chamber to said module to develop a desired pattern of flow of gaseous tempering medium along the length of said module.

10. Apparatus as in claim 9, wherein said means to alter the flow of tempering medium comprises an arcuate vane carried by said elongated plenum chamber.

11. Apparatus as in claim 9, wherein said means to alter the flow of tempering medium comprises an elongated porous member aligned with the length of said module and having a porosity that varies along the length thereof.

12. Apparatus as in claim 11, wherein said porous member is apertured and has an aperture density that is a maximum at the portion thereof adjacent said common plenum chamber and decreases with increasing distance therefrom.

13. Apparatus as in claim 9, wherein said means to alter the flow of tempering medium comprises means decreasing the cross-sectional area of each said elongated plenum chamber with increasing distance from said common plenum chamber.

14. Apparatus as in claim 13, wherein said means decreasing the cross-sectional area of each said elongated plenum chamber comprises an oblique wall extending along the length of said elongated plenum chamber and converging toward said apertured wall of said module attached thereto in a direction away from said common plenum chamber.

15. Apparatus as in claim 9, comprising means to regulate the rate of flow of said cool gaseous tempering medium to each of said common plenum chambers independently of each other common plenum chamber.

16. Apparatus as in claim 8, comprising means for readily attaching and detaching each said module from said elongated plenum chamber with which it communicates for readily replacing said module with another module having a different slot configuration.

17. Apparatus for tempering hot glass sheets by flowing cool streams of gaseous tempering medium against the opposite surfaces thereof comprising an upper elongated quench bed and a lower elongated quench bed in spaced relation to and facing said upper quench bed, each said quench bed including a series of modules, each provided with a flat apertured wall for applying thin streams of gaseous tempering medium against the surface of a succession of glass sheets conveyed longitudinally of said bed past said modules, said modules being spaced apart to provide therebetween longitudinally spaced exhaust passages extending transversely of said bed continuously across the entire width of said conveyed glass sheets, said elongated quench beds extending from an upstream end adjacent an exit of a furnace for heating said glass sheets to an elevated temperature suitable for tempering and a downstream end, and means to provide cool gaseous tempering medium at a rate sufficient to cause said gaseous tempering medium to flow through said slots at a rate sufficient to cool said glass sheets sufficiently rapidly to temper said sheets and to be exhausted through said exhaust passages, wherein said modules comprise a first pair of opposed modules located immediately downstream of said furnace exit and having their associated elongated slots directed diagonally through the thickness of said flat, apertured walls of said first pair of opposed modules in a downstream direction disposed at a relatively large oblique angle to a plane normal to the major surface of glass sheets conveyed along the length of said bed and a second pair of opposed modules located downstream of said first pair of opposed modules and having elongated slots directed diagonally through the thickness of said flat, apertured walls of said second pair of opposed modules in a downstream direction disposed at a lesser oblique angle to said plane than said relatively large angle.

18. Apparatus as in claim 17, further including a third pair of opposed modules located downstream of said second pair of opposed modules and having elongated slots that extend parallel to one another normal to the thickness of said flat, apertured walls of said third pair of opposed modules.

19. Apparatus as in claim 17, wherein said means to provide cool gaseous tempering medium comprises a plurality of opposed pairs of common plenum chambers, each of said common plenum chambers communicating with a plurality of spaced elongated plenum chambers, each extending transversely of said elongated quench bed and communicating with one of said modules, and means to regulate the rate of flow of said cool gaseous tempering medium to each of said common plenum chambers independently of each other of said common plenum chambers.

20. Apparatus as in claim 17, comprising means for readily attaching and detaching each said module from said elongated plenum chamber with which it communicates for readily replacing said module with another module having a different slot configuration.

21. Apparatus as in claim 17, wherein said means to provide cool gaseous tempering medium comprises a plurality of opposed pairs of common plenum chambers located along one side of said elongated quench bed, each said common plenum chamber communicating with a plurality of spaced elongated plenum chambers, each extending transversely of said elongated quench bed and communicating with one of said modules, said modules extending longitudinally of said elongated plenum chambers, and means associated with each said elongated plenum chamber to alter the pattern of flow of gaseous tempering medium from said common plenum chamber to said module to develop a desired pattern of flow of gaseous tempering medium along the length of said module.

22. Apparatus as in claim 21, wherein said means to alter the flow of tempering medium comprises an arcuate vane carried by said elongated plenum chamber.

23. Apparatus as in claim 22, wherein said means to alter the flow of tempering medium comprises an elongated porous member aligned with the length of said module and having a porosity that varies along the length thereof.

24. Apparatus as in claim 23, wherein said porous member is apertured and has an aperture density that is a maximum at the portion thereof adjacent said common plenum chamber and decreases with increasing distance therefrom.

25. Apparatus as in claim 21, wherein said means to alter the flow of tempering medium comprises means decreasing the cross-sectional area of each of said elongated plenum chamber with increasing distance from said common plenum.

26. Apparatus as in claim 25, wherein said means decreasing the cross-sectional area of each said elongated plenum chamber comprises an oblique wall extending along the length of said elongated plenum chamber and converging toward said apertured wall of said module attached thereto in a direction away from said common plenum chamber.

27. Apparatus as in claim 17, wherein said elongated slots extend parallel to one another diagonally of the glass sheet facing surfaces of said apertured walls of said modules disposed adjacent said furnace exit, and adjacent of said elongated slots of each said module overlap one another along the length of said elongated bed.

28. Apparatus as in claim 27, further including a plurality of glass edge engaging means located along one edge of said elongated quench beds for moving said glass sheets downstream between said beds, and said elongated slots are oriented to enable said blasts of gaseous tempering medium to provide a component of force against said glass sheets in a direction transverse of the length of said beds and toward said glass edge engaging means.

29. Apparatus as in claim 28, wherein each said flat apertured wall has a glass sheet facing surface in an oblique plane making a small angle of less than 15° with the horizontal and said glass edge engaging means is disposed along the lower longitudinal edge of said quench bed.

30. Apparatus as in claim 29, wherein said glass edge engaging means comprises a plurality of rotatable discs of a given diameter, each mounted concentrically on a different one of a plurality of aligned drive shafts for making rotating edge contact with the lower edge of said glass sheets to convey the latter along a path parallel to a line along which said drive shafts are aligned.

31. A method of tempering glass sheets to provide said sheets with a high temper and little surface distortion comprising heating each glass sheet in a series thereof to a temperature sufficient for tempering while conveying said sheets through a hot atmosphere, and cooling the opposite major surfaces of each of said heated sheets by passing each of said heated sheets between a pair of sets of streams of cool gaseous tempering medium, first directed at relatively large oblique angles relative to planes normal to the major surfaces of said sheets when the latter pass through a first region immediately downstream of said hot atmosphere, then to streams of cool gaseous tempering medium directed at relatively small oblique angles relative to said planes when said sheets pass through a second region downstream of said first region, and then subjecting said glass sheets to additional streams of cool gaseous tempering medium directed normal to the major surfaces of said sheets when the latter pass through a third region downstream of said second region.

32. A method as in claim 31, wherein said sheets are conveyed in said downstream direction by frictional engagement along an edge thereof and at least said streams in said first region are directed in a direction such as to impart a component of motion to said sheets transverse to said downstream direction to increase the force of said frictional engagement.

33. A method of tempering glass sheets as in claim 31, wherein said streams of cool gaseous tempering medium are directed against the opposite major surfaces of said heated glass sheets by conveying said steams through slots having an approximate uniform width of between about 1/100 inch (2.5 millimeters) and about 1/32 inch (0.8 millimeter).

34. A method as in claim 33, wherein said streams are conveyed through slots containing a total area not exceeding about 6 percent of the total area of a bed containing said slots and after said streams are directed against said opposite major surfaces, removing said gaseous tempering medium through exhaust passages occupying at least 20 percent of the area of said bed.

* * * * *